United States Patent

Arya et al.

[11] Patent Number: 5,889,636
[45] Date of Patent: Mar. 30, 1999

[54] ELECTRICAL CONNECTION FOR SLIDER/SUSPENSION ASSEMBLY

[75] Inventors: Satya Prakash Arya; A David Erpelding; Darrell Dean Palmer; Tzong-Shii Pan; Surya Pattanaik; Victor Wing Chun Shum, all of San Jose, Calif.; Yoshio Uematsu, Fujisawa, Japan

[73] Assignee: International Business Machines Corporation, Armonk, N.Y.

[21] Appl. No.: 873,777

[22] Filed: Jun. 12, 1997

[51] Int. Cl.[6] ........................................ G11B 5/48
[52] U.S. Cl. .................................................. 360/104
[58] Field of Search ..................... 360/104–106

[56] References Cited

U.S. PATENT DOCUMENTS

| | | | |
|---|---|---|---|
| 4,761,699 | 8/1988 | Ainslie et al. | 360/103 |
| 4,879,620 | 11/1989 | Yamashita | 360/123 |
| 5,068,759 | 11/1991 | Matsuzaki | 360/103 |
| 5,293,288 | 3/1994 | Ishikawa et al. | 360/103 |
| 5,530,604 | 6/1996 | Pattanaik | 360/104 |
| 5,699,212 | 12/1997 | Erpelding et al. | 360/104 |
| 5,739,982 | 4/1998 | Arya et al. | 360/104 |

*Primary Examiner*—Allen T. Cao
*Attorney, Agent, or Firm*—John H. Holcombe; Douglas R. Millett

[57] ABSTRACT

Disclosed are an electrical connection assembly for a data storage device and a method of fabricating the electrical connection between a transducer termination pad formed on a slider and a suspension having a conductive lead structure. A compliant cantilevered conductive pad is formed at the end of the conductive lead structure. A solder bump is formed on the transducer termination pad, and may be formed subsequent to dicing the sliders. The slider is placed in mechanical contact with the suspension for mechanical support such that the solder bump contacts the cantilevered conductive pad, which cantilevered conductive pad complies with the solder bump to absorb positional errors. Then, the solder bump is heated, preferably by a laser, so as to reflow the solder bump to make an approximately right angle solder fillet joint electrical connection with the cantilevered conductive pad.

26 Claims, 6 Drawing Sheets

Section A-A

FIG. 2b

Section A-A

ELECTRICAL CONNECTION FOR SLIDER/SUSPENSION ASSEMBLY

TECHNICAL FIELD

This invention relates to an electrical connection for a slider/suspension assembly of a data storage disk file, and, more particularly, to electrically connecting a transducer mounted on a slider to leads of an integrated lead suspension.

BACKGROUND OF THE INVENTION

Data storage disk files typically utilize one or more rotatable disks having a magnetic recording surface on each side of each of the disks and transducers mounted on sliders for reading and/or writing data on the magnetic recording surfaces. Each slider is mechanically supported on a suspension to maintain the slider in a close transducing relationship with respect to the corresponding magnetic recording surface. The suspension is attached to an actuator for moving the transducer radially over the disk to a desired track and maintaining the transducer over the track centerline during read or write operations.

The suspension typically loads, or provides a force against the slider, to counter the force of the air bearing between the slider and the magnetic recording surface of the rotating disk. The force is typically provided by a load beam which is mounted on an arm of the actuator and provides a spring action which biases the slider toward the surface of the disk. A flexure and gimbal is typically attached to the distal end of the load beam, and supports the slider, which is mechanically supported by epoxy bonding. The flexure and gimbal provide controlled flexibility in pitch and roll motion of the slider relative to its direction of motion on the rotating disk recording surface and provide resistance to yaw.

One type of suspension is an integrated lead suspension which incorporates a laminated conductive lead structure for connecting the transducer and the disk drive read/write electronics. An example of a laminated structure and the method of attaching the conductive leads to the transducer is illustrated in U.S. Pat. No. 4,761,699. The laminated structure comprises a structural layer of stainless steel, an insulating layer of polyimide formed on the structural layer, and a patterned conductive layer of etched copper alloy formed on the insulating layer. The described process for attaching the conductive layer electrical leads to the transducer is complicated and requires both passivation of the conductive layer, followed by the creation of vias through the passivation, and, most importantly, requires that it be heated in a furnace with the slider and transducer in order to reflow solder bumps. The alignment of the pads is difficult to accomplish and the heat of the furnace must be controlled precisely so as to not affect the transducer. The temperature control is possible with an inductive transducer, but is critical when an MR (magnetoresistive) read transducer is utilized and it is easy to destroy the MR transducer.

An alternative approach is described in U.S. Pat. No. 5,530,604, which forms solder bumps on both the transducer termination pads and the conductive leads of the patterned conductive layer of the laminated suspension. One or both of the solder bumps are then flattened and the slider is then attached to the suspension. A laser is used to heat the solder bumps so that they expand back into a spherical shape from the flattened shape upon reflow such that they make contact with each other. There are three drawbacks to this approach. First, the two sets of solder bumps must be closely aligned in order to insure a robust, reliable reflow process. Second, the solder must be applied to the transducer termination pads at the wafer level and the wafer processed through the slider fabrication without damage to the solder, a task that is difficult to achieve. Third, the flattening of the solder bumps requires considerable force, which force is difficult to accomplish when applied to the transducer termination pads.

What is needed is the provision for substantial tolerance in the alignment of the transducer termination pads and the leads of the patterned conductive layer and still make a reliable connection.

SUMMARY OF THE INVENTION

Disclosed are an electrical connection assembly for a data storage device and a method of fabricating the electrical connection between a transducer termination pad formed on a slider and a suspension having a conductive lead structure. A compliant cantilevered conductive pad is formed at the end of the conductive lead structure. A solder bump is formed on the transducer termination pad, and may be formed subsequent to dicing the sliders. The slider is placed in mechanical contact with the suspension for mechanical support such that the solder bump contacts the cantilevered conductive pad, which cantilevered conductive pad complies with the solder bump to absorb positional errors. Then, the solder bump is heated, preferably by a laser, so as to reflow the solder bump to make an approximately right angle solder fillet joint electrical connection with the cantilevered conductive pad.

For a fuller understanding of the present invention, reference should be made to the following detailed description taken in conjunction with the accompanying drawings.

BRIEF DESCRIPTION OF THE DRAWINGS

FIG. 2 is a perspective illustration.

DETAILED DESCRIPTION OF THE INVENTION

Figure 1:
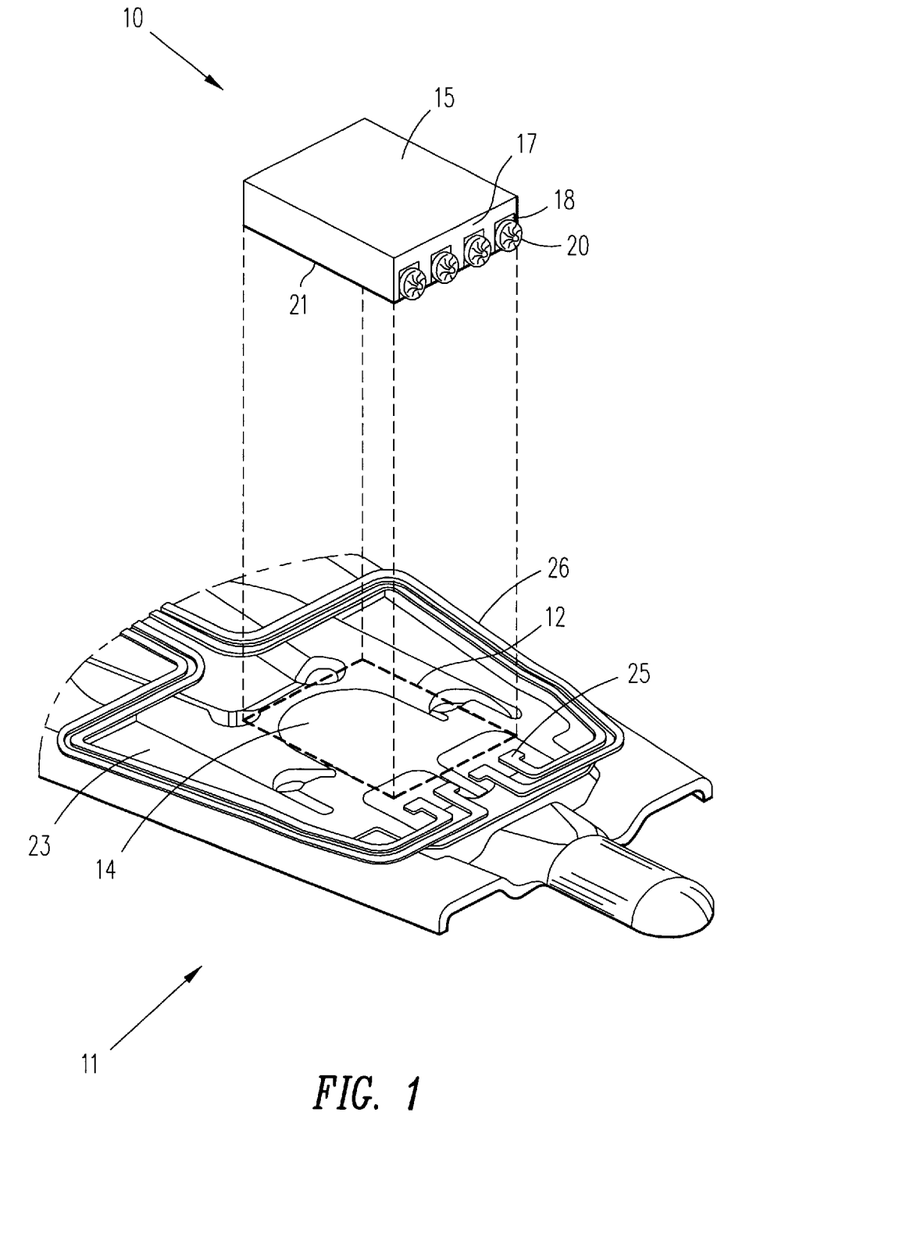
FIG. 1 is a perspective exploded illustration of a suspension with lead structure and slider with solder bumps of the present invention before the connections are made.

An embodiment of the present invention is illustrated in FIG. 1. A slider 10 is shown which is to be attached to a suspension assembly 11 in the position illustrated by phantom lines 12 on tongue 14. Slider 10 is formed in typical fashion, comprising a hard ceramic material with an air bearing surface 15 formed thereon which is designed to interact with the air moved by laminar flow with a moving disk past the slider so as to "fly" in close proximity to the surface of the disk. One or more transducers are formed on the trailing surface 17 of the slider 10 and are provided with conductive leads terminating at termination pads 18. The transducers may be any suitable magnetic transducers, but preferably are thin film magnetic inductive write and magnetoresistive (MR) read transducers for reading and writing magnetic signals on a magnetic recording surface of the disk. The transducers are fabricated on a ceramic wafer by known photolithographic deposition and etching processes. The wafer is sliced into rows of sliders which are lapped to a predetermined height and then the row diced into individual sliders.

Solder bumps 20 are affixed to the transducer termination pads 18, preferably offline subsequent to the dicing of the slider 10 from a row of sliders and as a precursor to attaching the slider to the suspension. A solder bump is a formed volume of solder that may be provided by a process called "solder wire bumping" which generally results in the solder bumps having the shape illustrated. If it is not desired to affix the solder bumps offline, they may alternatively be provided by screening, electroplating, or vapor deposition at the wafer level. All of these processes are known to those of skill in the art, as described in the '604 patent.

The slider 10 is then mounted to the suspension 11 by affixing surface 21 of the slider to tongue 14 of the suspension, preferably by adhesive bonding.

In accordance with the present invention, conductive pads 25 of read/write electrical leads 26 are cantilevered so as to comply with the solder bumps 20 as the slider 10 is mounted to absorb positional errors in the placement of the solder bumps 20 with respect to the slider mounting surface 21.

Figure 2:
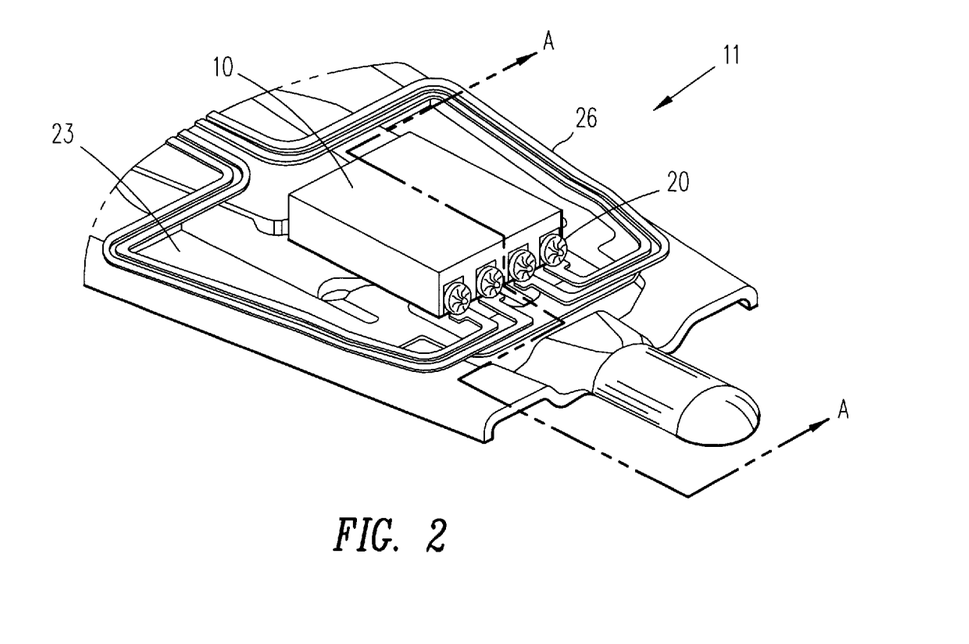
Figure 2A:
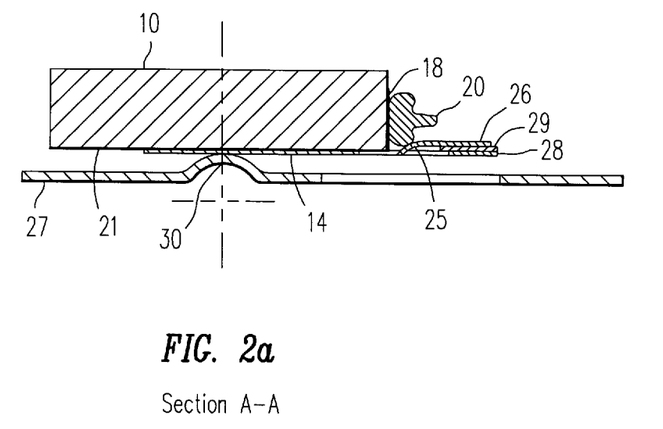
FIGS. 2a and 2b are sectional illustrations, of the suspension, with lead structure and slider of FIG. 1 as the connections are made.

FIG. 2 illustrates the slider/suspension assembly after the slider is attached in accordance with FIG. 1. FIG. 2a is a sectional view of the slider/suspension assembly of FIG. 2 taken along the section lines A—A. A flexure 23 is positioned on the actuator load beam 27 for attaching the laminated suspension, which may comprise a support structure layer 28, a dielectric layer 29 and the conductive lead layer 26. The support structure 28 in this embodiment is used for making the flexure 23. The support structure layer 28 may be, for example, a layer of stainless steel, the dielectric layer 29 may be, for example, a layer of polyimide, and the conductive lead layer 26 may be, for example, a layer of copper. The actuator load beam 27 provides a gimbal load point 30 which provides the loading force of the load beam to the tongue 14 of the laminated suspension support layer 28 and to the attached slider 10 for forcing the slider into proximity with the associated magnetic disk.

Referring to FIG. 2a, conductive lead layer 26 and conductive pads 25 are cantilevered from the laminated suspension support layer 28 and dielectric layer 29. The cantilever arrangement may be provided by any suitable means, such as by selectively etching the support layer and the dielectric layer. As the result of the cantilever arrangement, the conductive pads 25 comply with the solder bumps 20, making certain contact with the solder bumps and deflecting downward as illustrated.

Figure 2B:
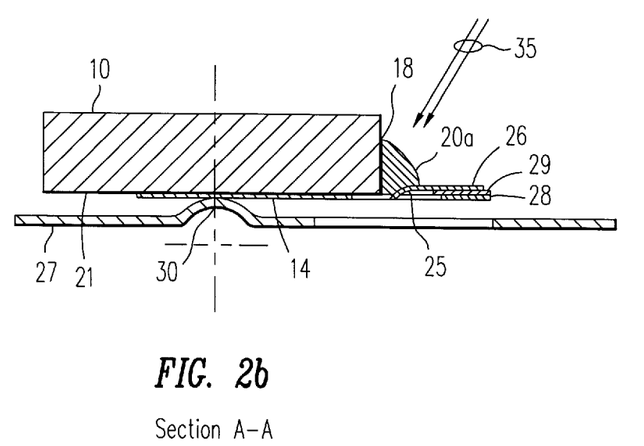

Referring to FIG. 2b, which is also taken along section lines A—A, a heating source, such as a laser beam 35 or other high energy heat source, is focussed on each of the solder bumps 20, reflowing the solder bump to form an approximate right angle fillet 20a, thereby bonding to conductive pads 25. The compliant cantilevered conductive pad 25 may reflex upward somewhat during the reflow of the solder bump 20.

Thus, each reflowed solder bump 20a is conductively affixed to both the corresponding transducer termination pad 18 and the corresponding cantilevered conductive pad 25, providing a conductive path from the transducer to the read/write channel of the disk drive.

Figure 3:
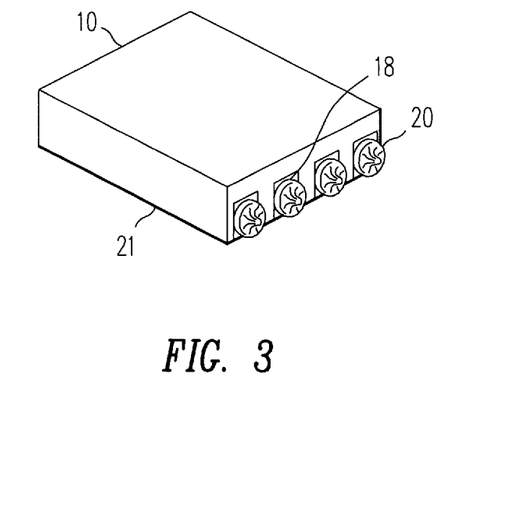
FIG. 3 is a perspective illustration of the slider of FIG. 1.
Figure 4:
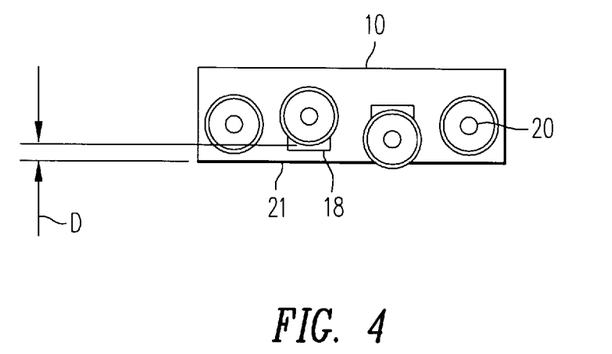
FIG. 4 is a front view of the slider of FIG. 3 illustrating solder bump misregistration.

FIGS. 3 and 4 provide an illustration of examples of misalignments of the solder bumps 20 with respect to the mounting surface 21 of a slider 10 which are easily accommodated by the present invention. Referring additionally to FIG. 2a, to insure that the solder bumps 20 always contact the compliant cantilevered conductive pads, dimension D in FIG. 4 is chosen to be less than the sum of the thicknesses of the conductor lead layer 26, and dielectric layer 29.

Figure 5:
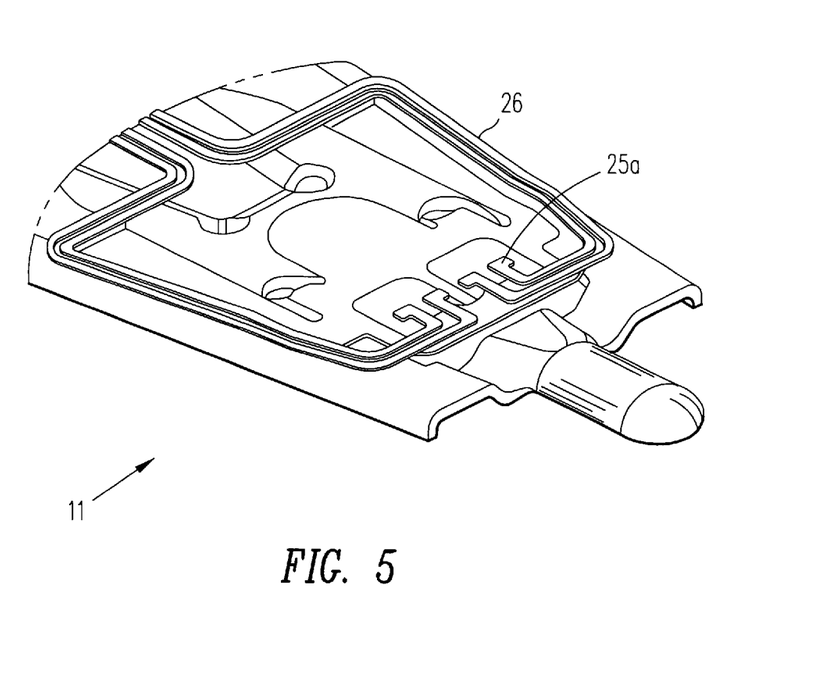
FIG. 5 is a perspective view of an alternative suspension and lead structure of the present invention.

FIG. 5 illustrates an alternative embodiment of the cantilevered conductive pads of the present invention wherein the pads 25a are pre-tinned with solder. This will insure that the solder bumps always wet the pads and produce a reliable solder fillet upon laser solder reflow.

Figure 6:
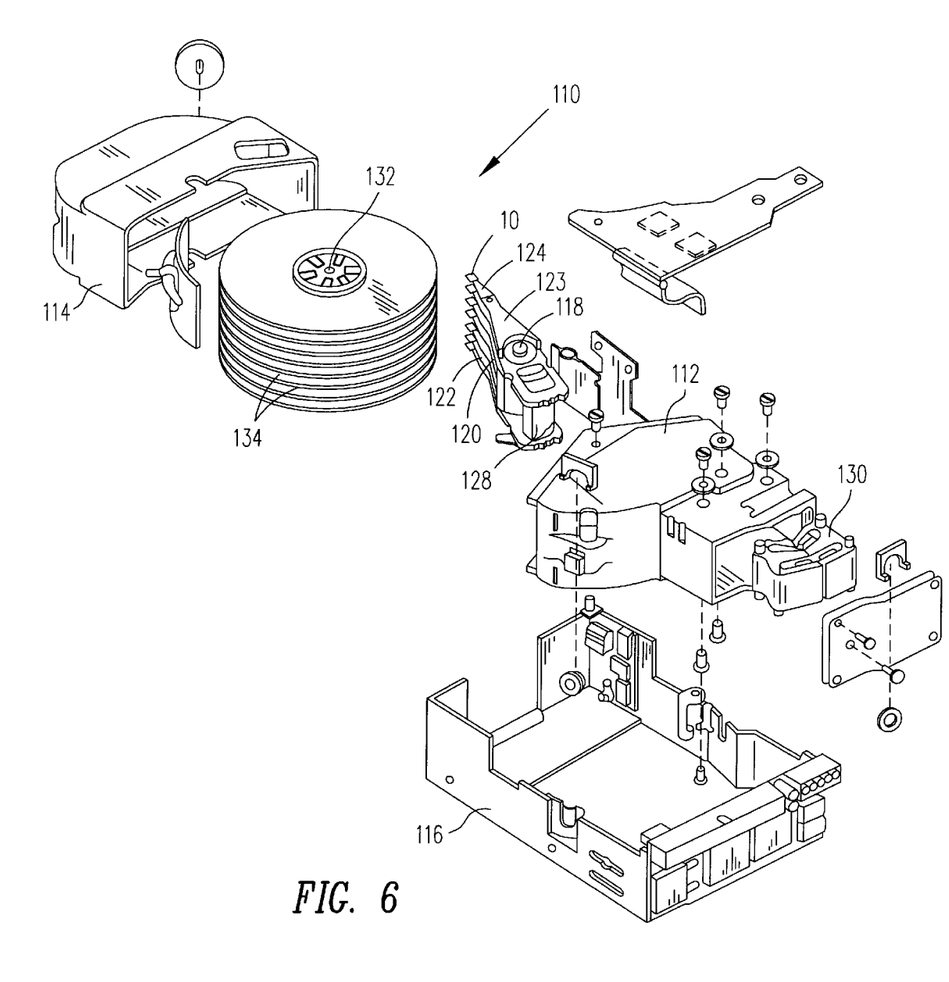
FIG. 6 is a perspective exploded view of a magnetic disk file employing the connection of the present invention.

FIG. 6 is an exploded view of an exemplary disk drive 110 incorporating the electrical connection of the present invention. The disk drive 110 includes a housing 112 and 114 which is mounted within a frame 116. Rotatably attached within housing 112 on an actuator shaft 118 is an actuator arm assembly 120. A comb-like E block structure 122 is provided at one end of the actuator arm assembly 120 having a plurality of actuator arms 123. Attached to the separate arms 123 on the E block 122 are spring load beams 124. The suspensions and sliders 10 are attached to the load beams 124. On the other end of the actuator arm assembly 120 opposite the sliders 10 is a voice coil motor comprising coil 128. Attached within the housing 112 is a pair of magnets 130. The magnets 130 and the voice coil 128 are key parts of the voice coil motor which rotates the actuator assembly 120 about the actuator shaft 118. A spindle 132 is mounted within housing 112. Rotatably attached to the spindle 132 are a number of spaced apart disks 134.

Figure 7:
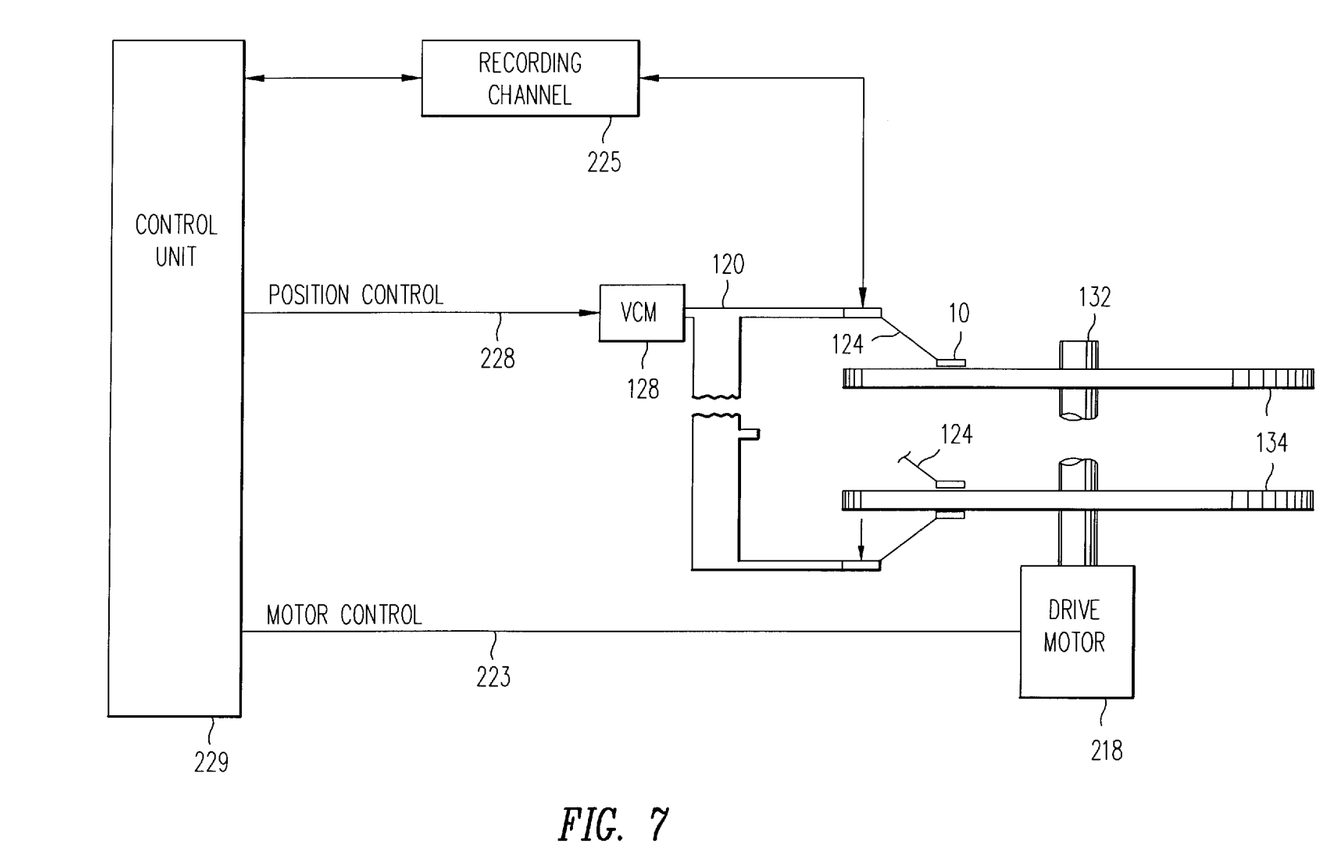
FIG. 7 is a schematic and block diagram illustration of the magnetic disk file of FIG. 6.

Referring additionally to FIG. 7, the disks 134 are rotated by a spindle motor 218 which generates an air bearing between the sliders 10 and the recording surfaces of the disks 134. The various components of the disk drive 110 are operated by control unit 229. Control unit 229 provides control signals to control various system operations such as motor control signals on line 223 to control the speed of spindle motor 218. Controller 229 causes voice coil motor coil 128 to selectively rotate the actuator 120 and move the sliders 10 to desired tracks on the disks 134. Read and write signals are communicated to and from the read/write transducers on the sliders 10 by means of recording channel 225, which includes conductor lines running along load beams 124 to conductors 26 of the laminated suspensions of the present invention.

It is contemplated that the electrical connections of the present invention may be implemented in other types of magnetic disk drives and other types data storage files, such as optical, than the specific example illustrated.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for fabricating an electrical connection between a transducer termination pad formed on a slider for a data storage device and a suspension having a conductive lead structure, said suspension for mechanically supporting said slider, comprising the steps of:

forming a cantilevered conductive pad at the end of said conductive lead structure;

forming a solder bump on said transducer termination pad;

placing said slider in mechanical contact with said suspension for said mechanical support such that said solder bump contacts said cantilevered conductive pad, which cantilevered conductive pad complies with said solder bump to absorb positional errors; and heating said solder bump so as to reflow said solder bump to form a substantially right angle fillet between said transducer termination pad and said cantilevered conductive pad to make said electrical connection with said cantilevered conductive pad.

2. The method of claim 1, wherein said step of forming a cantilevered conductive pad additionally comprises tinning said pad to insure said solder bump wets said cantilevered conductive pad in said heating step.

3. The method of claim 1, wherein said step of forming said cantilevered conductive pad additionally comprises patterning a laminated material having a conductor layer, a dielectric layer, and a structural layer to form said pad from said conductive layer.

4. The method of claim 3, wherein said step of forming said cantilevered conductive pad comprises etching said laminated material in a precursor process.

5. The method of claim 1, wherein said heating step is performed by shining a laser beam on said solder bump.

6. The method of claim 1, wherein said step of forming said solder bump comprises solder wire bumping in a precursor process.

7. A method for fabricating electrical connections between transducer termination pads formed on a slider for a data storage device and a suspension having a conductive lead structure with a plurality of conductive leads, said suspension for mechanically supporting said slider, comprising the steps of:

forming a cantilevered conductive pad at ones of said plurality of conductive leads of said conductive lead structure;

forming a solder bump on each said transducer termination pad;

placing said slider in mechanical contact with said suspension for said mechanical support such that each said solder bump contacts said cantilevered conductive pad, which cantilevered conductive pad complies with said solder bump to absorb positional errors; and heating said solder bumps so as to reflow said solder bumps to form substantially right angle fillets between said transducer termination pads and said cantilevered conductive pads to make said electrical connections to said cantilevered conductive pads.

8. The method of claim 7, wherein said step of forming cantilevered conductive pads additionally comprises tinning said pads to insure said solder bumps wet said cantilevered conductive pads in said heating step.

9. The method of claim 7, wherein said step of forming said cantilevered conductive pads additionally comprises patterning a laminated material having a conductor layer, a dielectric layer, and a structural layer to form said pads from said conductive layer.

10. The method of claim 9, wherein said step of forming said cantilevered conductive pads comprises etching said laminated material in a precursor process.

11. The method of claim 7, wherein said heating step is performed by shining a laser beam on said solder bumps.

12. The method of claim 4, wherein said step of forming said solder bumps comprises solder wire bumping in a precursor process.

13. An electrical connection assembly for a data storage device transducer formed on a slider, said transducer having at least one termination pad, comprising:

a conductive lead structure having at least one compliant cantilevered conductive pad, said at least one compliant cantilevered conductive pad at a substantially right angle to a corresponding said at least one transducer termination pad; and at least one solder fillet joint formed of a solder bump affixed to said at least one transducer termination pad and positioned against said corresponding at least one compliant cantilevered conductive pad, which pad complies with said solder bump to absorb positional errors, said solder bump heated to reflow and electrically connect said compliant cantilevered conductive pad to said termination pad.

14. The electrical connection assembly of claim 13, wherein said conductive lead structure comprises a structural layer, a dielectric layer, and a conductor layer, and said at least one compliant cantilevered conductive pad is formed of said conductor layer unsupported by said structural layer.

15. The electrical connection assembly of claim 14, wherein said at least one cantilevered conductive pad is tinned.

16. The electrical connection assembly of claim 13, additionally comprising:

a suspension mechanically supporting said slider and mechanically supporting said conductive lead structure.

17. A slider/suspension assembly for a data storage system, comprising:

a slider;

a transducer formed on said slider and having a plurality of electrical leads terminating at termination pads on a surface of said slider;

a suspension mechanically supporting said slider and having a conductive lead structure thereon with a plurality of conductive leads, each terminating at a compliant cantilevered conductive pad, each said compliant cantilevered conductive pad at a substantially right angle to a corresponding said transducer termination pad;

a plurality of solder fillet joints, each formed of a solder bump affixed to said at least one transducer termination pad and positioned against said corresponding compliant cantilevered conductive pad, which pad complies with said solder bump to absorb positional errors, said solder bump heated to reflow and electrically connect said compliant cantilevered conductive pad to said termination pad.

18. The slider/suspension assembly of claim 17, wherein said suspension conductive lead structure comprises a structural layer, a dielectric layer, and a conductor layer, and said compliant cantilevered conductive pads are formed of said conductor layer unsupported by said structural layer.

19. The slider/suspension assembly of claim 18, wherein said compliant cantilevered conductive pads are tinned.

20. The slider/suspension assembly of claim 17, wherein said transducer comprises a read/write magnetic transducer having four said electrical leads terminating at termination pads on a surface of said slider.

21. The slider/suspension assembly of claim 20, wherein said read/write magnetic transducer comprises an MR head.

22. A data storage magnetic disk file, comprising:

at least one rotatable disk having magnetic recording surfaces on each side thereof;

a motor for rotating said at least one rotatable magnetic disk;

a plurality of sliders, each having a transducer formed thereon and having a plurality of electrical leads extending from said transducer and terminating at termination pads on a surface of said slider, said transducers for reading and/or writing data on said magnetic recording surfaces of said at least one rotatable disk;

a plurality of suspensions, each mechanically supporting one of said sliders and having a conductive lead structure thereon with a plurality of conductive leads, each terminating at a compliant cantilevered conductive pad, each said compliant cantilevered conductive pad at a substantially right angle to a corresponding said transducer termination pad, said suspension maintaining said slider in a close transducing relationship with respect to said magnetic recording surface during rotation of said at least one disk;

an actuator coupled to said plurality of suspensions for moving said transducers of said sliders to selected data tracks on said at least one disk;

a plurality of solder fillet joints, each formed of a solder bump affixed to one of said termination pads and positioned against said corresponding compliant cantilevered conductive pad, which pad complies with said solder bump to absorb positional errors, said solder bump heated to reflow and electrically connect said compliant cantilevered conductive pad to said termination pad; and a read/write channel connected to said conductive lead structure for reading data from and/or transmitting data to said transducers.

23. The data storage magnetic disk file of claim 22, wherein said suspension conductive lead structures comprise a structural layer, a dielectric layer, and a conductor layer, and said compliant cantilevered conductive pads are formed of said conductor layer unsupported by said structural layer.

24. The data storage magnetic disk file of claim 23, wherein said compliant cantilevered conductive pads are tinned.

25. The data storage magnetic disk file of claim 22, wherein said transducers each comprise a read/write magnetic transducer formed on the trailing edge of said slider and having four said electrical leads terminating at said slider termination pads.

26. The data storage magnetic disk file of claim 25, wherein said read/write magnetic transducer comprises an MR head.

* * * * *